United States Patent

[15] 3,704,588

Trabbic

[45] Dec. 5, 1972

[54] ACCELERATION CONTROL VALVE
[72] Inventor: Gerald W. Trabbic, Marshall, Mich.
[73] Assignee: Eaton Corporation, Cleveland, Ohio
[22] Filed: April 1, 1971
[21] Appl. No.: 130,361

[52] U.S. Cl. .................. 60/53 R, 60/52 B, 137/115, 417/299
[51] Int. Cl. .............................................. F16d 31/00
[58] Field of Search ....... 60/53 R, 19, 52 B; 137/115; 417/299, 279

[56] References Cited

UNITED STATES PATENTS

| | | | |
|---|---|---|---|
| 2,058,894 | 10/1936 | Link | 60/53 R |
| 2,852,918 | 9/1958 | Schwary | 60/53 R X |
| 3,402,549 | 9/1968 | Connett et al. | 60/19 |
| 3,522,999 | 8/1970 | Liles | 417/299 |

Primary Examiner—Edgar W. Geoghegan
Attorney—Teagno & Toddy

[57] ABSTRACT

An acceleration control valve for a hydrostatic transmission having a pump, a motor, a high pressure fluid conduit, a low pressure fluid conduit and a fluid by-pass in parallel around the motor from the high to the low pressure conduit. The acceleration control valve controls the fluid flow through the by-pass and thus regulates the application of fluid to the motor. The valve is normally open allowing a portion of fluid from the pump to by-pass the motor. Upon pressurization of the high pressure conduit the control valve gradually closes as fluid flows through the by-pass thus providing a gradually increasing amount of fluid to the motor which results in smooth and gradual acceleration of the motor.

9 Claims, 6 Drawing Figures

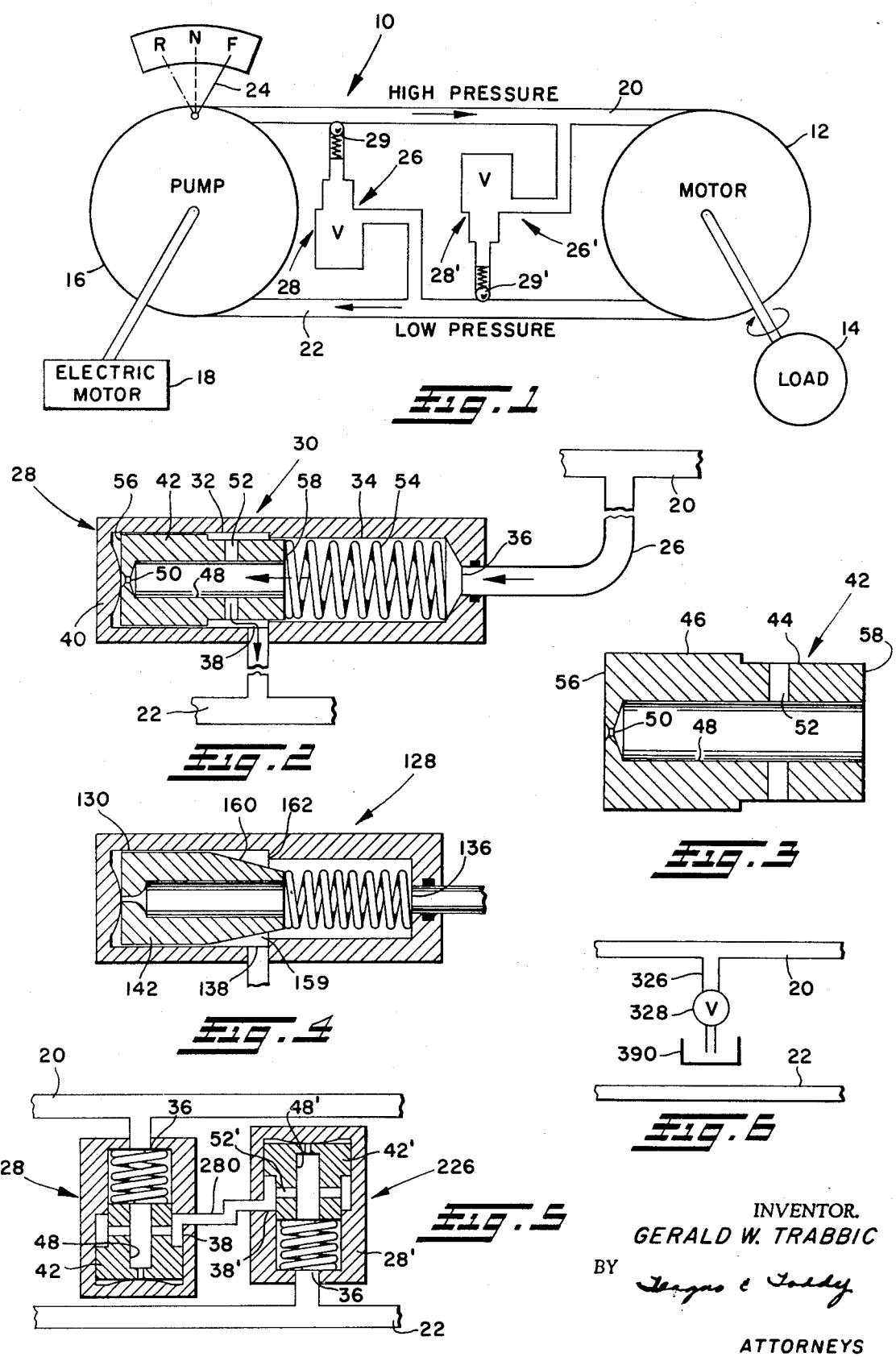

ACCELERATION CONTROL VALVE

FIELD OF THE INVENTION

This invention relates generally to hydrostatic transmissions of the type having a motor and a pump, one or both of which may be of the variable displacement type. More particularly, this invention relates to an acceleration control valve for providing smooth acceleration and deceleration of the motor of a hydrostatic transmission as the transmission is shifted to and from its neutral condition.

DESCRIPTION OF THE PRIOR ART

Heretofore, hydrostatic transmissions have suffered from a tendency to jerk when shifted to or from their neutral condition. This tendency is especially pronounced when there is a relatively light load to be moved as is the case in a garden tractor application or the like. This sudden change in acceleration, or jerk, has a very detrimental effect on the transmission, the mechanical parts of the machine being controlled and, of course, the load. Earlier attempts to solve this problem have involved complicated and expensive hydraulic and/or mechanical linkage systems. These systems have been less than satisfactory as they are expensive to produce and difficult to maintain.

SUMMARY OF THE INVENTION

In accordance with the present invention, the disadvantages of the prior art have been overcome to the extent that acceleration may be controlled by means of a simple and inexpensive control valve.

The above is accomplished by providing a progressively decreasing by-pass flow around the motor when the transmission is shifted to or from the neutral position. The by-pass is controlled by an acceleration control valve which controls the flow of fluid through the by-pass. The progressively decreasing by-pass flow around the motor results in smooth and controlled acceleration of the motor.

In a hydrostatic transmission including a pump, a motor and fluid conduits therebetween, an acceleration control valve is provided in a by-pass interconnection between the fluid conduits. The acceleration control valve controls the mass flow rate of fluid permitted to by-pass the motor of a hydrostatic transmission when that transmission is shifted to or from its neutral condition. The valve is normally open and is spring biased to that position. The valve comprises a body with a piston member slidably disposed therein to control the flow of fluid therethrough. The piston has two opposing faces of different areas exposed to fluid pressure and is normally biased by spring force and pressure acting on the smaller area face to a position allowing maximum flow through the valve. As the flow of fluid through the valve increases, the pressure acting on the piston face having the larger area will overcome the bias of the spring and the valve will gradually close, causing a correspondingly greater percentage of fluid from the pump to flow to the motor and thus assure smooth acceleration of the motor.

An object of this invention is to provide a new and improved acceleration control for hydrostatic transmissions.

Another object of this invention is to provide a new and improved hydrostatic transmission having smooth and gradual acceleration.

Another object of this invention is to provide a hydrostatic transmission having a by-pass around the motor which permits a gradually decreasing flow of fluid therethrough as the transmission is shifted to or from its neutral condition resulting in smooth acceleration of the motor.

Another object of the invention is to provide a new and improved hydrostatic transmission having a fluid by-pass around the motor for gradually increasing the flow of fluid to the motor resulting in smooth acceleration of the motor.

A further object of this invention is to provide a new and improved acceleration control valve of inexpensive cost.

Further objects and advantages of the present invention will be apparent from the following description and reference to the drawings.

BRIEF DESCRIPTION OF THE DRAWINGS

FIG. 1 is a schematic view of a hydrostatic transmission utilizing the invention of the present application.

FIG. 2 is a cross-section of the acceleration control valve of the present invention.

FIG. 3 is a detailed cross-section of the piston member of the acceleration control valve of FIG. 2.

FIG. 4 is a cross-section of an acceleration control valve embodying the features of the present invention utilizing a modified piston.

FIG. 5 is a schematic view of a modified embodiment of the present invention.

FIG. 6 is a schematic view of a further modified embodiment of the present invention.

DETAILED DESCRIPTION OF THE INVENTION

Referring to FIG. 1, the hydrostatic transmission system may be seen generally at 10. Hydrostatic transmission system 10 includes a fixed displacement fluid motor 12 which is drivingly connected to a load 14. A variable displacement fluid pump 16 which is driven by a constant speed external source, such as an electric motor 18, is connected to the fluid motor 12 by first and second conduits 20, 22. It is understood that a fixed displacement motor — variable displacement pump type of transmission is used for illustrative purposes only and that this invention is equally applicable to fixed displacement pump — variable displacement motor transmissions and the like. In the embodiment shown, the variable displacement pump 16 has speed and direction control means 24 for controlling the output of the pump 16 which is shown in the F or forward position. By design, conduit 20 will be a high pressure conduit delivering high pressure fluid from the pump 16 to the motor 12 and conduit 22 will be a low pressure conduit returning fluid from the motor 12 to the pump 16 when the control means 24 is in the position F. It is understood that when control means 24 is in the R or reverse position the conduits will have the opposite functions, namely 20 will be the low pressure return conduit and 22 will be the high pressure conduit causing the motor 12 to reverse its direction of rotation. An important feature of this invention is parallel by-pass loop 26 which is controlled by acceleration control valve 28. The by-pass 26 includes a one-way check valve 29. The acceleration control valve 28, by controlling the flow rate of fluid to the motor 12, provides a smooth acceleration upon engagement of the transmission from the neutral position, N. The hydraulic transmission 10 may also include a by-pass system 26' with control valve 28' for controlling the acceleration of the transmission in both its forward and reverse modes of operation. Acceleration control valves 28 and 28' are normally open, thus allowing fluid to by-pass the motor from the high pressure to low pressure conduit. The valves will gradually close as fluid flows through the by-pass thus providing a gradually increasing flow of pressurized fluid to the motor 12 which will result in gradually increasing and smooth acceleration, saving wear and tear on the transmission, the power source and the load.

Referring to FIGS. 2 and 3, acceleration control valve 28 is shown in greater detail. The valve 28 is shown as interposed in series between high pressure conduit 20 and low pressure conduit 22 in a by-pass loop 26. The valve 28 comprises a hollow cylindrical housing 30 having a larger interior diameter bore 32 and an axially adjacent smaller interior diameter bore 34. An inlet 36 to bore 34 and an outlet 38 from bore 32 define the fluid flow path through the valve. An end portion 40 of the housing 30 seals the left hand end of bore 32 in the housing 30. Slidably mounted within the valve housing 30, in sealing relation with the bores 30 and 32 is a differential area piston 42, see FIG. 3. Piston 42 has sections 44 and 46 of different exterior diameter which correspond with the interior diameter of bores 34 and 32 of the housing 30 respectively. The piston 42 has an axially extending bore 48 opening at its righthand end and a smaller restricted orifice 50 which communicates the bore 48 with the piston's lefthand end. Radial bores 52 extend from the axial bore 48 to the exterior surface 44 of piston 42.

The piston 42 is normally biased to the left as in FIG. 2 by a spring 54, so that by-pass 26 is normally open permitting flow from high pressure conduit 20 to low pressure conduit 22 when the pump 16 is in neutral condition or first shifted from neutral condition.

In operation, starting from the neutral condition, the pump 16 is placed into the forward position F which causes a large volume of high pressure fluid to flow through conduit 20 toward motor 12. Due to the larger pressure differential across by-pass 26 then across motor 12 a large percentage of this fluid will by-pass the motor and flow into by-pass loop 26. The remainder of the fluid will continue in conduit 20 to the motor 12 for operation thereof. The fluid entering by-pass loop 26 will enter valve bore 34 through inlet 36 and then flow into axial piston bore 48. The majority of fluid in piston bore 48 will flow out radial bores 52 into valve bores 32 and then to low pressure conduit 20 through outlet 38. A smaller portion of the fluid in axial bore 48 will flow through restricted orifice 50 to act upon larger piston face 56 of piston 42. The force of fluid pressure acting on larger piston face 56 will gradually overcome the combined bias of spring 54 and pressure acting on smaller piston face 58 to move piston 42 to the right. As piston 42 moves to the right it will gradually seal radial bores 52 in valve bore 34 and thus gradually restrict fluid flow through the by-pass loop 26. The gradual sealing of radial bores 52 provides a variable fluid flow orifice for controlling the flow rate of fluid through by-pass 26. Thus the motor 12 will gradually receive an increasing flow of fluid from pump 16 and will experience a gradual and smooth acceleration until the entire volume of fluid from the pump 16 is passing through the motor 12. The rate at which by-pass loop 26 is gradually closed may be varied by simple variations of spring 54.

MODIFICATION I

FIG. 4 shows a modified valve 128 of the present invention using a modified piston 142. Fluid flow through the valve is from inlet 136, past the variable fluid flow orifice 159 formed by the gap between conical surface 160 of the piston 142 and the corner 162 of the housing 130, and out the outlet 138. As the piston 142 moves to the right the orifice becomes gradually increasingly restricted until it finally blocks flow through the valve 128 completely. The tapered surface 160 provides an exceptionally smooth acceleration of the motor 12, by producing an infinite variation in the fluid flow path at orifice 159.

MODIFICATION II

FIG. 5 shows a back-to-back valve arrangement wherein a single bypass loop 226 is utilized to bypass fluid around the motor 12 both from 20 to 22 and from 22 to 20 depending upon which of the conduits, 20 or 22, is in the high pressure mode. In this arrangement valves 28 and 28' have their outlets 38 and 38' interconnected by conduit 280.

In operation, assuming conduit 20 to be the high pressure conduit, fluid flowing out valve outlet 38 will flow through conduit 280 into valve 28' outlet 38', from there the fluid will flow through bore 52' into bore 48' and out inlet 36' into conduit 22. When conduit 22 is the high pressure conduit, fluid flowing out valve outlet 38' into valve outlet 38 will follow a similar flow path.

MODIFICATION III

FIG. 6 illustrates another modified form of the invention in which fluid is by-passed from high pressure conduit 20 directly to a reservoir 390 by means of by-pass 326 controlled by acceleration control valve 328 which operates in the same manner as previously described valve 28.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:
1. A hydrostatic transmission with controlled acceleration comprising:
   a pump for supplying pressurized fluid;
   a motor in fluid communication with said pump;
   a by-pass in fluid communication with said pump for diverting a portion of the fluid from said pump away from said motor, said motor and said by-pass connected in parallel to said pump; and control means in said by-pass for controlling the flow of fluid through said by-pass, said means being normally open and operable to gradually close said by-pass and restrict fluid flow therethrough for gradually increasing the flow of fluid to said motor, said control means comprising:

a housing having an inlet and an outlet connected in series in said by-pass, said housing having a first bore adjacent said inlet and a larger bore adjacent said outlet, said first and larger bores being concentric and axially adjacent;

a differential area piston having first and second opposed faces of smaller and larger areas respectively slidably disposed within said bores, said piston biased by a spring and fluid pressure acting on said first face to a first position whereat the piston allows fluid to flow from said inlet to said outlet, said piston biased by fluid pressure acting on said second face to gradually overcome the bias of said spring and fluid pressure acting on the first face to move to a second position whereat said inlet is blocked from said outlet, said piston comprising axially adjacent first and larger exterior diameter sections slidably and sealingly engaged in said first and larger bores respectively, said first section carrying said first face and said larger section carrying said second face, said piston having an axial bore communicating with said inlet and a radial bore communicating said axial bore with the exterior surface of said first section, said radial bore communicating with said outlet in said first position and sealed by said first bore in said second position.

2. The transmission of claim 1 wherein said piston additionally comprises a restricted fluid passageway communicating said axial bore with said second face.

3. The transmission of claim 1 wherein said piston comprises a larger exterior diameter section sealingly and slidably disposed in said larger bore and an axially adjacent tapered section of decreasing cross-sectional diameter towards said inlet, said larger diameter section carrying said second face and said tapered section carrying said first face, said piston moving toward said inlet when moving from said first to said second position to form said variably restricted fluid flow orifice between the outer surface of said tapered section and the interior of said first bore.

4. The transmission of claim 3 wherein said piston additionally comprises a restricted fluid passageway communicating said inlet and said second face.

5. A hydrostatic transmission having controlled acceleration comprising:
a reversible pump,
a reversible motor,
first and second fluid conduits connecting said pump to said motor;
a first and second one-way by-pass connected in parallel around said motor, said first by-pass operable to by-pass fluid around the motor from said first to said second conduit when said first conduit is at a higher pressure than said second conduit, said second by-pass operable to by-pass fluid around the motor from said second to said first conduit when said second conduit is at a higher pressure than said first conduit, and
a first and second acceleration control valve for controlling the flow of fluid through said first and second by-pass respectively, said control valves connected in series in said by-passes and being normally open and operable to gradually close as fluid flows therethrough.

6. The transmission of claim 5 wherein said control valves comprise:
a hollow housing having an inlet and an outlet, connected in series in said by-passes, said housing having an axially adjacent smaller interior diameter bore adjacent said inlet and a larger interior diameter bore adjacent said outlet;
and a piston slidably disposed within said housing for controlling the flow of fluid between said bores by providing a variably restricted fluid flow orifice therebetween, said piston in a first position providing maximum fluid flow through said orifice and in a second position blocking said orifice;
means for biasing said piston into said first position; and
means for moving said piston into said second position in response to fluid flowing through said valve.

7. The transmission of claim 6 wherein said control valves additionally comprise a spring for biasing said piston into said first position, said piston having a face opposed to said spring bias which communicates with said inlet for gradually moving said piston to said second position.

8. The transmission of claim 7 wherein said second face communicates with said inlet by means of a restricted fluid passageway.

9. The transmission of claim 8 wherein the outlet from said first housing is connected in series with the outlet of said second housing.

* * * * *